July 25, 1967   E. G. SMITH   3,332,298

TRANSMISSION CONTROL SYSTEM

Filed Aug. 4, 1965   2 Sheets-Sheet 1

INVENTOR
EARL G. SMITH
BY
Dick, Zarley, McKee & Thomte
ATTORNEYS

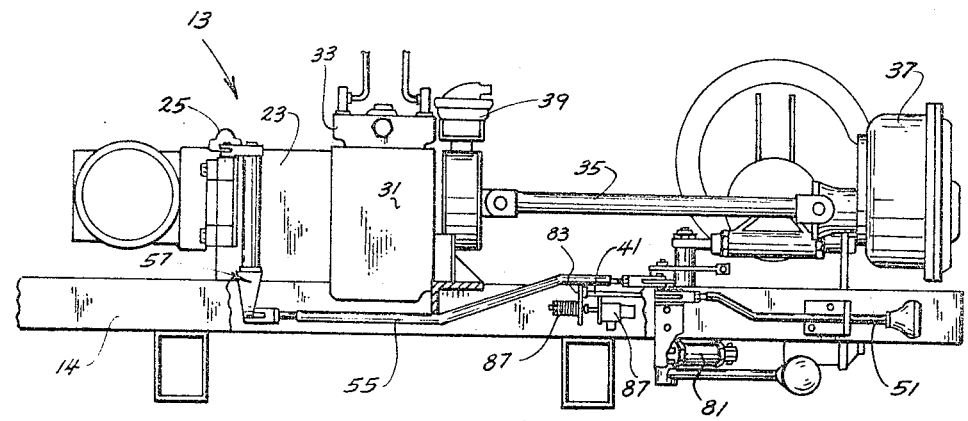

United States Patent Office 3,332,298
Patented July 25, 1967

3,332,298
TRANSMISSION CONTROL SYSTEM
Earl G. Smith, Waterloo, Iowa, assignor to Construction Machinery Company, Waterloo, Iowa, a corporation of Iowa
Filed Aug. 4, 1965, Ser. No. 477,189
16 Claims. (Cl. 74—472)

This invention relates to a transmission control system and more particularly to a transmission control system for a concrete mixing truck. Concrete mixing trucks consist generally of a mixing drum rotatably mounted on the rearward end of a truck. The drum is rotated in one direction to charge the concrete and is rotated in the opposite direction to discharge the concrete from the drum. The direction of rotation and rate of rotation of the dum is selectively controlled by the operator of the truck.

Therefore, it is a principal object of this invention to provide a transmission control system for a concrete mixing truck.

A further object of this invention is to provide a transmission control system for a concrete mixing truck which is remotely operated.

A further object of this invention is to provide a transmission control system which permits the direction of rotation of the mixing drum to be smoothly changed.

A further object of this invention is to provide a transmission control system which prevents damage to the associated equipment.

A further object of this invention is to provide a transmission control system which includes a throttle retardation means which as actuated when the direction of rotation of the mixing drum is changed.

A further object of this invention is to provide a transmission control system which includes an air operated control means for shifting the three speed transmission into its various speeds.

A further object of this invention is to provide a transmission control system which includes an air operated brake means which is activated when the direction of rotation of the mixing drum is changed.

A further object of this invention is to provide a transmission control system which includes a quadrant cam for activating the air portion of the control system.

A further object of this invention is to provide a transmission control system which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 4 is a sectional view of the transmission control system as seen on line 4—4 of FIG. 3 with portions thereof cut away to more fully illustrate the invention;

FIG. 5 is a perspective view of the throttle retardation means;

FIG. 6 is a perspective view of the quadrant cam portion of the invention;

FIG. 7 is a schematic view of the air circuitry of the transmission control system.

Figure 1:
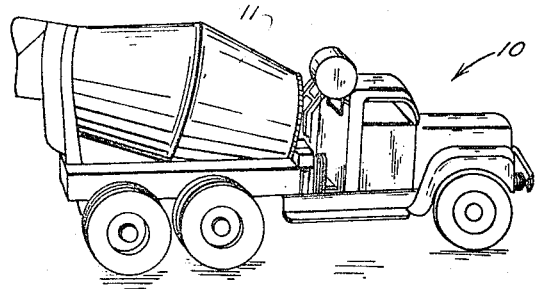
FIG. 1 is a perspective view of a concrete mixing truck.
Figure 2:
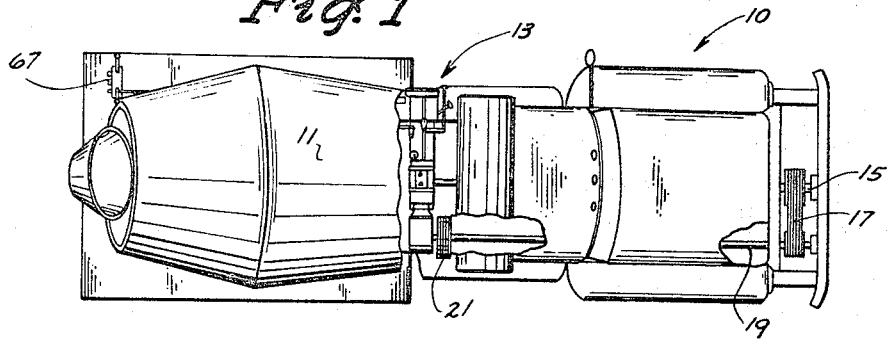
FIG. 2 is a top view of the concrete mixing truck with portions thereof cut away to more fully illustrate the invention.

The numeral 10 generally designates a truck having a concrete mixing drum 11 operatively rotatably mounted on the rearward end thereof. The numeral 13 generally represents a transmission system mounted on a frame 14 forwardly of drum 11 and which is conventionally operatively connected to the truck power take-off 15 by belts 17, shaft 19 and belts 21.

Transmission system 13 includes a gear-type transmission 23 having forward and reverse clutches which are fluid operated. The clutches of transmission 23 are selectively activated by means of a valve 25 mounted thereon which has a rod 27 slidably extending therefrom. Transmission 23 is operatively connected to gear box 29 which in turn is operatively connected to shaft 19 by means of belts 21.

A second transmission 31 of the sliding gear type is operatively connected in series to transmission 23 and is a three speed transmission. Operatively connected to transmission 31 for selectively shifting transmission 31 into one of its three speeds is a three position air cylinder 33. Extending outwardly from transmission 31 is a power shaft 35 which extends to and is operatively connected to a drive box 37 which is operatively connected to the mixing drum. Power shaft 35 is provided with an air actuated brake means 39 designed to brake the speed of power shaft 35 as will be explained later.

Figure 3:
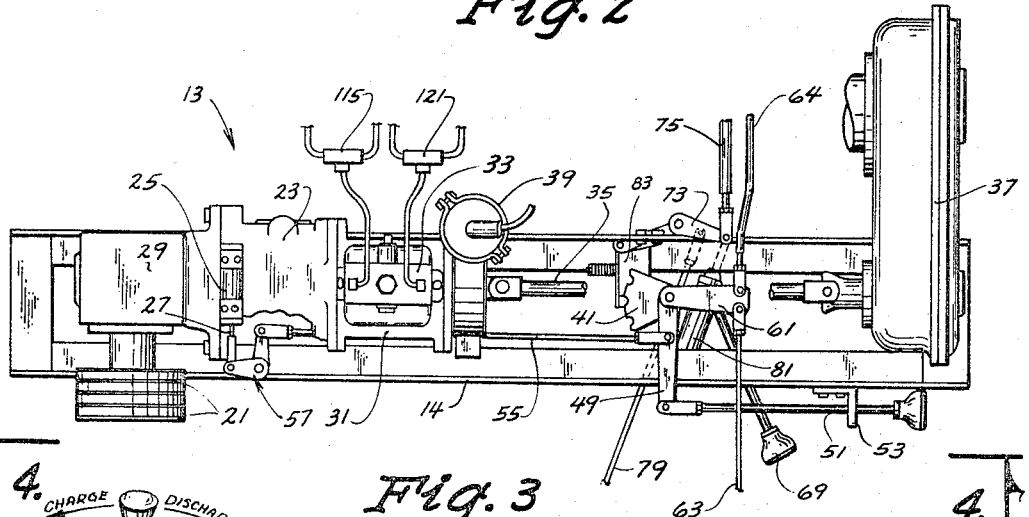
FIG. 3 is a top elevational view of the transmission control system.
Figure 8:
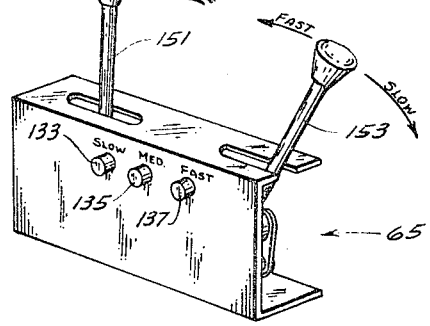
FIG. 8 is a perspective view of the control station which would be positioned inside of the cab of the truck.

As seen in FIG. 4, a quadrant cam 41 is operatively horizontally pivotally secured to frame 14 and has three spaced apart notches 43, 45 and 47 formed in its outer end. Rigidly secured by one of its ends and extending transversely from the inner end of quadrant cam 41 is an arm member 49. The other end of arm member 49 is pivotally connected to lever 51 (forward-reverse lever) which slidably extends through a bracket 53 on frame 14. Pivotally connected to arm member 49 intermediate the length thereof is a rod 55 which extends to and is connected to linkage 57 which is connected to valve 25 (FIG. 3).

Extending upwardly from the inner end of quadrant cam 41 is a spacer 59 which is rigidly secured to arm member 49 by any convenient means and has an arm member 61 rigidly secured by one of its ends thereto and extending therefrom (FIG. 6). A rod 63 is pivotally secured to the other end of arm member 61 and extends forwardly therefrom to forward control station 65. A rod 64 is also pivotally secured to the other end of arm member 61 but extends rearwardly therefrom to rearward control station 67.

A throttle 69 is horizontally pivotally secured to frame 14 and is operatively connected to the truck engine for controlling the speed thereof. Secured to the inner end of throttle 69 is a vertical pipe 71 having an arm member 73 rigidly secured by one of its ends to the upper end thereof. A rod 75 is pivotally secured to the outer end of arm member 73 and extends to rear control station 67. An arm member 77 is rigidly secured to pipe 71 adjacent the lower end thereof which extends outwardly therefrom. A rod 79 is pivotally connected to arm member 77 intermediate the length thereof and extends to the forward control station 65. An air operated throttle retard cylinder 81 is pivotally connected by its piston rod to the outer end of arm member 77 and operatively connected to frame 14 at its other end.

Pivotally secured by one of its ends to frame 14 is a lever 83 having an arcuate finger 85 on its other end which is adapted to successively engage notches 43, 45 and 47 as quadrant cam 41 is horizontally pivotally moved with respect thereto. A spring means is operatively connected to lever 83 to yieldably maintain finger 85 in engagement with quadrant cam 41.

An air valve 87 normally open to exhaust is in the pivotal path of lever 83 (FIG. 7) and is adapted to be activated only when finger 85 is in notch 45 (neutral). Valve 87 is in communication with a source of air pressure such as air tank 89 by means of conduit 91. Valve 87 is in communication with a pressure hold back valve 93 by means of conduit 95. As seen in FIG. 7, throttle retard air cylinder 81 is operatively connected to conduit 95 by means of conduit 97.

A conduit 99 connects valve 93 to a bank of three push button control valves 101, 103 and 105 located at the rearward end of the truck at rear control station 67. Valves 101, 103 and 105 are normally open to exhaust and are connected to a three position air shuttle valve 107 by means of conduits 109, 111 and 113 respectively. Shuttle valve 107 is connected to a shuttle valve 115 by conduit 119 and to a shuttle valve 121 by conduit 123. Shuttle valves 115 and 121 are connected to the three position air cylinder 33 by means of conduits 125 and 127 respectively. A conduit 129 is connected to conduit 99 which is operatively connected to air brake means 39. A conduit 131 extends from conduit 129 to a bank of three push button control valves 133, 135 and 137 located at forward control station 65. Valves 133, 135 and 137 are normally open to exhaust and are connected to a three position air shuttle valve 139 by means of conduits 141, 143 and 145 respectively. Shuttle valve 139 is connected to shuttle valves 115 and 121 by means of conduits 147 and 149 respectively.

The numeral 151 generally designates the charge-discharge lever at forward station 65 while the numeral 153 designates the throttle at forward station 65.

The normal method of operation is as follows: Transmission system 13 is supplied power by the truck power take off 15 as previously described. As previously described, the clutches of transmission 23 are selectively activated by means of valve 25 which causes power shaft 35 to be rotated in one direction or the other direction depending upon which clutch within transmission 23 is activated. Valve 25 is activated when piston rod 27 thereof is slidably moved with respect thereto. The three speed transmission 31 is controlled by the three position air cylinder 33 as discussed above. When the piston rod of air cylinder 33 is fully extended, transmission 31 will be in its fast speed range. When the piston rod of air cylinder 33 is fully withdrawn, transmission 31 will be in its slow speed range. When the piston rod of air cylinder 33 is extended approximately one-half of its length, transmission 31 will be in its medium speed range. The various push button control valves and shuttle valves cause the piston rod of air cylinder 33 to be moved to the various positions just described by supplying air to either or both ends of air cylinder 31. Transmission 23 can be controlled from forward station 65, rearward station 67 or at a point immediately behind the cab of the vehicle (lever 51). Transmission 31 can be controlled from forward station 65 or from rearward station 67. The operating speed of the truck engine can be controlled from forward station 65 (lever 153), rearward station 67 or at a point immediately behind the vehicle cab (throttle 69).

When it is desired to charge the concrete in a slow speed range, the charge-discharge lever at any of the stations is first moved to its neutral position. The movement of any of the charge-discharge levers to a neutral position causes finger 85 to engage notch 45 in quadrant cam 41. When finger 85 engages notch 45 in quadrant cam 41, air control valve 87 is activated which causes air to be supplied to throttle retard cylinder 81 and to hold back valve 93. Pressure hold back valve 93 momentarily holds back the air pressure supplied thereto and then permits the air to pass therethrough to the push button valve previously described as well as to brake 39. This permits the de-acceleration of the motor before the brake 39 is applied. Push button valve 133 or 101 is then pushed depending upon whichever is the most convenient to the operator. The activation of push button valve 101 causes air to be supplied to shuttle valve 107. Shuttle valve 107 furnishes air to shuttle valve 115 so that the piston rod of the three position air cylinder 33 is completely withdrawn. The withdrawal of the piston rod into cylinder 33 causes transmission 31 to be shifted into its slow speed range. If push button valve 103 had been activated, shuttle valve 107 would have supplied air to shuttle valves 115 and 121 so that the piston rod of air cylinder 33 would have been extended from cylinder 33 approximately one-half of its length. If push button valve 105 had been activated, shuttle valve 107 would have supplied air to shuttle valve 115 so that the piston rod of air cylinder 33 was caused to be completely extended.

Pressure hold back valve 93 also supplies air to brake 39 so that brake 39 frictionally engages power shaft 35 to prevent rotational movement thereof when transmission 23 is in its neutral position. One of the charge-discharge levers is then moved to its charge position which causes quadrant cam 41 to be pivotally moved with respect to finger 85 which causes finger 85 to be moved out of notch 45 which causes the deactivation of air valve 87. The deactivation of air valve 87 breaks the air circuit to throttle retard cylinder 81, pressure hold back valve 93 and brake 39. Brake 39 is released from its frictional engagement with power shaft 35 and throttle retard cylinder 81 is also without power so that its piston rod can be freely moved. The breaking of the air circuit deactivates the various push button valves which means that the push button valves cannot be utilized to change the speed range of transmission 31 except while transmission 23 is in its neutral position. The movement of one of the charge-discharge levers causes piston rod 27 to be moved inwardly with respect to valve 25 which causes transmission 23 to be shifted into its charge position. Mixing drum 11 is then caused to be rotated in its charge direction. The throttle at forward station 65, rear station 67 or throttle 69 may then be moved to increase the rate of rotation of mixing drum 11. The movement of any of the throttle levers causes the piston rod of throttle retard cylinder 81 to be extended to its pivotal connection thereto.

When it is desired to shift from charge to discharge or from one speed range to another speed range, any one of the charge-discharge levers is moved to its neutral position. This causes quadrant cam 41 to be rotated so that finger 85 once again engages notch 45 which causes the activation of valve 87. The activation of valve 87 causes air to be supplied to throttle retard cylinder 81 which quickly withdraws its piston rod which in turn moves the throttle linkage so that the operating speed of the truck engine is quickly reduced. Pressure hold back valve 93 holds back the air pressure momentarily so that throttle retard cylinder 81 is provided an opportunity to complete its function and then permits the air to be supplied to brake 39 and the push button valves. The activation of brake 39 quickly stops the rotation of power shaft 35 due to the frictional engagement therewith which causes the rotation of drum 11 to be quickly stopped. The system may then be shifted into discharge or into a different speed range.

It can be appreciated that a transmission control system has been provided for a concrete mixing truck which may be remotely controlled to provide the utmost in convenience for the operator thereof. It can also be appreciated that a transmission control system has been provided which permits the reversing of the rotation of the mixing drum smoothly and quickly without damage to the equipment due to the unique way in which the throttle retard cylinder and brake mechanism is successively activated. It should be noted that a transmission control system has been provided which permits the direction of rotation of the mixing to be controlled; the speed range of the transmission to be controlled; and the rate of rotation of the mixing drum to also be controlled through the utilization of only two levers and three push buttons at any given station. Such convenience is extremely important in today's fast moving construction world.

Thus it can be appreciated that the device accomplishes at least all of its stated objectives.

Some changes may be made in the construction and arrangement of my transmission control system without departing from the real spirit and purpose of my invention, and it is my intention to cover by my claims, any modified froms of structure or use of mechanical equivalents which may be reasonably included within their scope.

I claim:

1. In combination, a truck frame, a concrete mixing drum rotatably mounted on said truck frame, a mechanical power source including a throttle means, transmission means operatively connecting said power source and said mixing drum for providing rotational motion to said mixing drum, said transmission means having a power output shaft, comprising, an air circuit including selective air responsive means on said transmission means whereby the speed of rotation of said power shaft can be selectively changed, a source of air under pressure in said air circuit, a plurality of speed control valves in said air circuit and being connected to said selective air responsive means whereby said air responsive means can be selectively operated, direction control means on said transmission means for controlling the rotation and the direction of rotation of said power output shaft, means for controlling said directional control means, an air control valve in said air circuit, and interlock means connecting said means for controlling said directional control means and said air control valve, to withhold air from said speed control valves when said pawer shaft is rotating.

2. The combination of claim 1 wherein an air actuated brake means is on said power output shaft and is connected in said air circuit, and a pressure hold back valve and said air actuated brake means are imposed in said air circuit between said air control valve and said speed control valves.

3. The combination of claim 1 wherein an accelerator control means is operatively connected to said power source to control the operating speed thereof; an air actuated brake means is on said power output shaft and is connected in said air circuit; an air actuated accelerator control element in said air circuit operatively connected to said accelerator control means and adapted upon being actuated to reduce the operating speed of said mechanical power source; and a pressure hold back valve, said air actuated accelerator control element and said air actuated brake means are imposed in said air circuit between said air control valve and said speed control valves.

4. The combination of claim 1 wherein said interlock means includes a quadrant cam means operatively engaging said air control valve.

5. The combination of claim 4 wherein said quadrant cam has a cam surface thereon having at least one notch formed therein; said quadrant cam adapted to cause said air control valve to supply air to said speed control valves when said notch on said cam surface is operatively engaging said air control valve.

6. In combination, a truck frame, a concrete mixing drum rotatably mounted on said truck frame, a mechanical power source including a throttle means, transmission means operatively connecting said power source and said mixing drum for providing rotational motion to said mixing drum, said transmission means having a power output shaft, comprising, a first transmission operatively connected to said power shaft and having a direction control means thereon for controlling the rotation and the direction of rotation of said power output shaft, a second transmission operatively connected to said power shaft and having an air responsive means thereon whereby the speed of rotation of said power shaft can be selectively changed, an air circuit including a plurality of speed control valves being operatively connected to said air responsive means whereby said air responsive means can be selectively operated, a source of air under pressure in said air circuit, means for controlling said direction control means, an air control means in said air circuit, and interlock means connecting said means for controlling said direction control means and said air control valve to withhold air from said speed control valves when said power shaft is rotating and to permit air to be supplied to said speed control valves when said power shaft is not rotating.

7. The combination of claim 6 wherein an air actuated brake means is on said power output shaft and is connected in said air circuit and a pressure hold back valve and said air actuated brake means are imposed in said air circuit between said air control valve and said speed control valves.

8. The combination of claim 6 wherein an accelerator control means is operatively connected to said power source to control the operating speed thereof; an air actuated brake means is on said power output shaft and is connected in said air circuit; an air actuated accelerator control element in said air circuit operatively connected to said accelerator control means and adapted upon being actuated to reduce the operating speed of said mechanical power source; and a pressure hold back valve, said air actuated accelerator control element and said air actuated brake means are imposed in said air circuit between said air control valve and said speed control valves.

9. The combination of claim 6 wherein said interlock means includes a quadrant cam means operatively engaging said air control valve.

10. The combination of claim 9 wherein said quadrant cam has a cam surface thereon operatively engaging said air control valve to permit air power to be supplied to said speed control valves at times.

11. The combination of claim 10 wherein an air actuated brake means is on said power output shaft and is connected in said air circuit, and a pressure hold back valve and said air actuated brake means are imposed in said air circuit between said air control valve and said speed control valves; said air actuated brake means being actuated when said quadrant cam permits said air control valve to supply air power to said speed control valves.

12. The combination of claim 10 wherein an air actuated accelerator control element is imposed in said air circuit and is operatively connected to said throttle means and is adapted upon being actuated to reduce the operating speed of said mechanical power source; said air actuated accelerator control element being actuated when said quadrant cam permits said air control valve to supply air power to speed control valves.

13. The combination of claim 6 wherein a pressure hold back valve is imposed in said air circuit between said air control valve and said speed control valves and an air actuated accelerator control element is imposed in said air circuit between said air control valve and said pressure hold back valve and is operatively connected to said throttle means and is adapted upon being actuated to reduce the operating speed of said mechanical power source; said air actuated accelerator control element being actuated prior to the supplying of air power to said speed control valves.

14. The combination of claim 13 wherein an air actuated brake means is on said power shaft and is imposed in said air circuit between said pressure hold back valves and said speed control valves.

15. The combination of claim 1 wherein said interlock means permits air to be supplied to said speed control valves when said power shaft is not rotating and wherein a pressure hold back valve is imposed in said air circuit between said air control valve and said speed control valves and an air actuated accelerator control element is imposed in said air circuit between said air control valve and said pressure hold back valve and is operatively connected to said throttle means and is adapted upon being actuated to reduce the operating speed of said mechanical power source; said air actuated accelerator control element being actuated prior to the supplying of air power to said speed control valves.

16. The combination of claim 1 wherein a plurality of control stations are located on said truck frame, with control means on each of said stations operatively secured to said interlock means to permit the selective control thereof from any of said stations.

References Cited

UNITED STATES PATENTS 2,743,798   5/1956   Aper et al. ---------- 192—4
3,269,206   8/1966   Carr ---------------- 74—472

ROBERT M. WALKER, *Primary Examiner.*

H. S. LAYTON, *Assistant Examiner.*